2,813,251
WAVE METERS

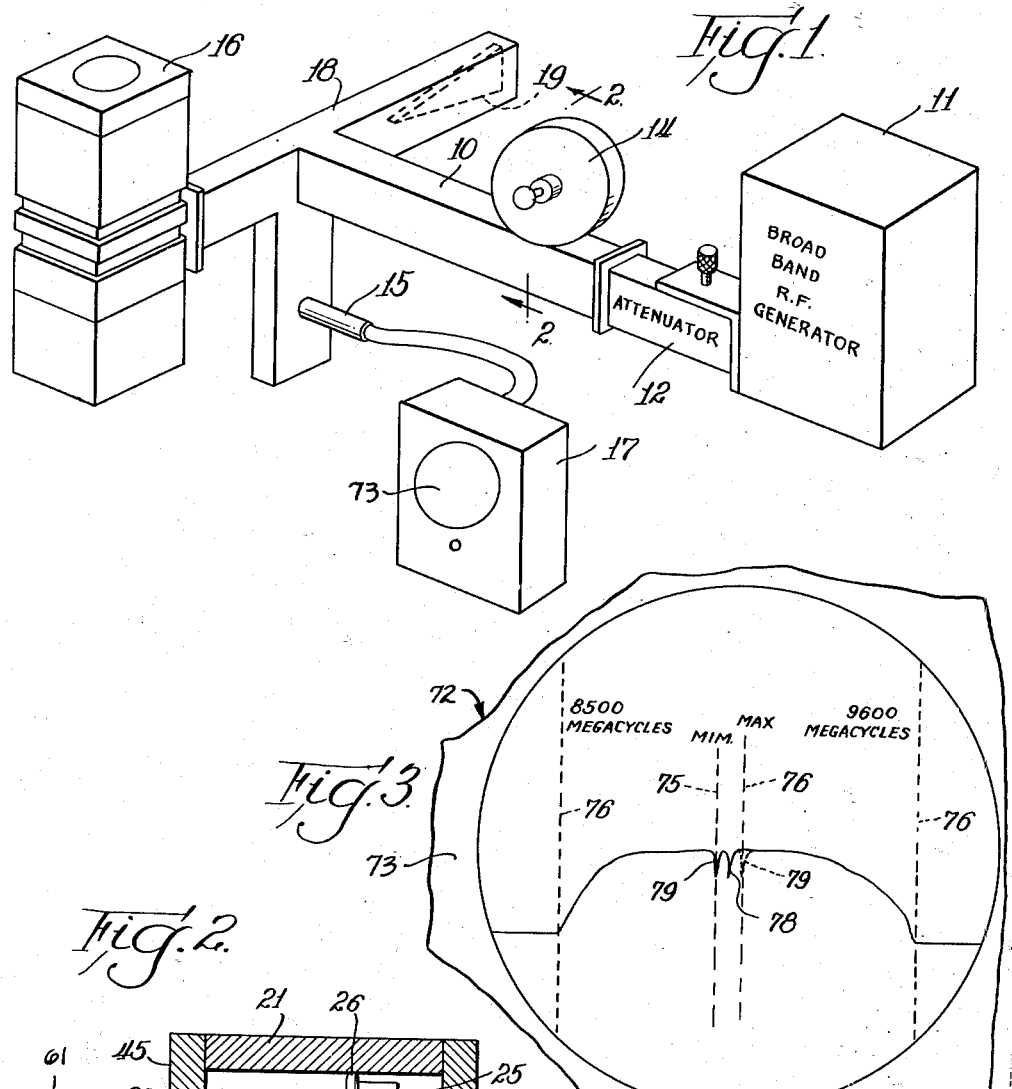
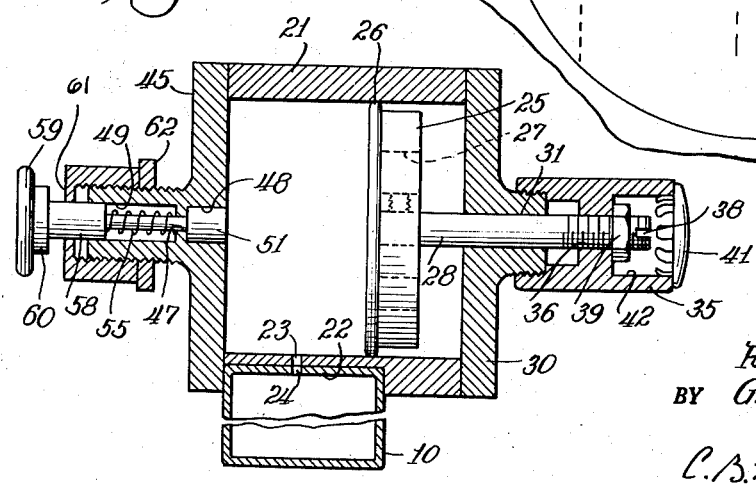

Raymond W. Brown, Evergreen Park, Ill., and Gerald A. Mitchell, White Bear Lake, Minn., assignors to Western Electric Company, Incorporated, New York, N. Y., a corporation of New York Application October 28, 1953, Serial No. 388,750

4 Claims. (Cl. 324—81)

This invention relates to wave meters and more particularly to resonant cavities.

In the testing for the resonant frequency of magnetrons or the like, a broad band radio frequency generator often is connected to one end of a wave guide and repeatedly generates waves varying from one end of the band to the other which are sent along a wave guide at the side of which may be mounted a magnetron anode for testing the resonant characteristics of its cavity. The generator is continuously varied over its predetermined range of frequencies, and an oscilloscope is swept in accordance with the cycling of the generator and forms a single trace. The anode cavity absorbs the portion of the output of the generator at the same frequency as the resonant frequency of the anode cavity to form a pip on the screen of the oscilloscope, which pip is located at the frequency at which the magnetron is operated. A second resonant cavity or wave meter of a known resonant frequency is provided on the wave guide to reduce the transmission of the waves at the resonant frequency of the second resonant cavity, which also forms a pip on the screen of the oscilloscope and the pip resulting from the anode cavity of the magnetron may be compared with the pip resulting from the known frequency of the second resonant cavity. However, often these pips are difficult to identify, and when it is attempted to adjust the magnetron to place its pip at the same point that the pip of the second resonant cavity occurs, much wasted effort occurs. Also there has been no resonant cavities which would quickly provide minimum and maximum pips on the oscilloscope screen so that the anode could be adjusted within this range rapidly.

An object of the invention is to provide new and improved wave meters.

Another object of the invention is to provide new and improved resonant cavities.

Another object of the invention is to provide resonant cavities which are quickly and momentarily adjustable so that pips resulting therefrom may be readily identified and distinguished from pips from other apparatus.

A further object of the invention is to provide resonant cavities which may be momentarily and quickly adjusted to form pips indicating minimum and maximum frequencies to which a magnetron anode may be adjusted.

A resonant cavity illustrating certain features of the invention may include a chamber having a predetermined resonant frequency and provided with an opening in a wall thereof. A plunger mounted in the opening is urged by push button means to retract to a position in which the plunger is flush with the wall of the cavity, and adjustable means limit the extent the push button means may be actuated to push the plunger into the cavity so that the plunger varies the resonant frequency of the cavity by a predetermined amount.

A complete understanding of the invention may be obtained from the following detailed description of a wave meter forming a specific embodiment thereof, when read in conjunction with the appended drawings, in which:

Fig. 1 is a perspective view of a wave meter forming one embodiment of the invention;

Fig. 2 is an enlarged section taken along the line 2—2 of Fig. 1; and

Fig. 3 is a view of the oscilloscope screen used in conjunction with the apparatus shown in Fig. 1.

Referring now in detail to the drawings, there is shown therein a wave guide 10, at one end of which is provided an attentuator 12 connected to a broad band radio frequency generator 11 of a well-known type, such as, for example, a reflex klystron in which the repeller voltage is varied by means of a 60 cycle voltage superimposed on its D. C. voltage, or a klystron with an external cavity whose dimensions can be changed mechanically at a rapid rate such as 20 times per second. In either example, the generator generates a broad band of frequencies. The generator generates, varying over its range at 60 cycles per second, electromagnetic waves of a frequency starting at 8500 megacycles and increasing gradually to 9600 megacycles per second. The waves generated by the generator 11 are transmitted through the attenuator 12 past a resonant cavity 14 and a crystal detector 15 of a well-known type to a magnetron anode 16 having a cavity whose resonant frequency is to be adjusted within predetermined limits by well known means (not shown). The crystal detector 15 transmits the received waves to an oscilloscope 17. The wave guide 10 includes a magic T section 18 in one arm of which is mounted a load 19 composed of a carbon coated Bakelite strip. The anode 16 is mounted on the opposite arm of the section 18.

The resonant cavity 14 includes a cylinder 21 having a flat 22 ground thereon which fits on the wave guide 10 and openings 23 and 24 in the cylinder 21 and the guide 10 provides communication therebetween. Other standard communicating means may be provided to connect the wave guide and the cylinder. A piston 25 having a rim 26 and an energy absorbing, reflection preventing magnetic backing portion 27 is fixed to a rod 28 mounted slidably in a bore 29 in an end plate 30 and a boss portion 31 formed on the end plate 30. A bushing 35 is threaded onto the boss 31 and is provided with a tapped bore 36, in which a threaded portion 37 of the rod 28 may be screwed by means of a screwdriver inserted into a slot 38 in the rod. A nut 39 is provided for locating the rod 28 in any desired adjusted position. A cap 41 covers a counterbore 42 formed in the bushing 35.

A second end plate 45 is secured integrally to the end of the cylinder 21 opposite to the plate 30, and is provided with an exteriorly threaded bossed portion 46 having a bore 47, a counterbore 48 and a counterbore 49. A small piston 51 of the same dimensions as that of the counterbore 48 is designed to be pulled into the counterbore 48 to a position in which the righthand face of the piston is flush with the righthand face of the end plate 45 by a compression spring 55 bearing against the bottom of the counterbore 49 and the end of a shank 58 of a push button 59. The shank 58 is slidably mounted in the counterbore 49. The push button 59 has a shoulder 60 formed thereon which is designed to engage a stop sleeve 61 threadable onto the threaded boss 46, and a nut 62 serves to lock the stop sleeve 61 in any desired position on the boss 46. Thus, the push button 59 may be pushed toward the right, as viewed in Fig. 2, against the action of the spring 55, until the shoulder 60 engages the end of the sleeve 61, which will insert the piston 51 a predetermined distance into the chamber 21 formed by the cylinder 36, the piston 25 and the inner face of the plate 45 to change, by a predetermined amount, the dimensions of the resonant cavity formed thereby. A flange 65 of the sleeve 61 acts as a guide for the shank of the push button.

The oscilloscope 17 includes a cathode ray tube 72 having a screen 73. Limit lines 75 and range lines 76 are formed on the screen 73. The oscilloscope sweeps the beam of the cathode ray tube from left to right, as viewed in Fig. 3, as the frequency input to the oscilloscope increases.

*Operation*

The piston 25 has been adjusted to and set at a position at which, with the push button 59 unactuated, the resonant frequency of the resonant cavity 14 is the same frequency as the minimum frequency for which it is desired to adjust the magnetron anode 16. The movement of the piston 51, as limited by the stop sleeve 61, is fixed by adjustment of the stop sleeve 61 to increase the resonant frequency of the cavity 14 when the push button 59 is fully actuated to a value at which maximum frequency permissible by the magnetron anode is provided. After the resonant cavity 14 is so adjusted, the magnetron anode is connected to the wave guide 10, as illustrated by the connection of the magnetron 16 thereto and the generator 11, magnetron 16 and oscilloscope 17 are operated, and a pip 78 is formed on the screen by the magnetron 16.

The wave generator 11 is actuated to automatically generate waves of a frequency varying at 60 cycles per second uniformly from about 8500 megacycles per second to about 9600 megacycles per second, and these waves are transmitted through the wave guide 10 past the resonant cavity 14 to the crystal detector 15 and the magnetron 16. The crystal detector 15 transmits the impulses to the oscilloscope 17 to form a trace on the screen of the cathode ray tube 72. The magnetron anode absorbs and cancels the waves from the wave guide 10 at the resonant frequency of the anode cavity so that the waves transmitted to the oscilloscope 17 by the crystal detector 15 have substantially less magnitude at the resonant frequency of the anode cavity to form a pip 78 in the trace 71. The resonant cavity 14 absorbs the energy from the waves being transmitted along the wave guide 10 during the portion of each cycle in which the waves are of the same frequency as that at which the resonant cavity is set, and this causes a pip 79 to be formed on the screen of the cathode ray tube 72. Whenever the push button 59 is pressed to the right, as viewed in Fig. 2, the shoulder 60 engages the stop sleeve 61, and the change in the resonant cavity caused thereby changes the resonant frequency thereof a predetermined amount to move the pip 79 from the position thereof shown in full lines in Fig. 3 to the position thereof shown in broken lines.

During the adjustment of the magnetron anode to bring the resonant frequency thereof between the minimum and maximum limits, the push button 59 may be actuated to move the pip 79 from its full line position to its broken line position to indicate the maximum frequency and such movement of the pip 79 may be detected whenever it is difficult to distinguish between the pipes 78 and 79, the pip 78 remaining stationary while the pip 79 is moved by the actuation of the push button.

The above-described apparatus serves to rapidly adjust magnetron anodes, such as the magnetron anode 16, without danger of adjusting the anode in the opposite direction to that which is desired, and provides readily observable minimum and maximum limits as desired.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a wave meter including a wave generator, a wave guide connected to said wave generator, an oscilloscope, a resonant cavity comprising a chamber having a predetermined shape and volume and connected to the wave guide, said chamber being provided with a hole in a wall thereof, a slug designed to fit in said hole so as to form a flush surface with the inner wall of the chamber, manually operable push button means for pressing the slug into the chamber, means for urging the slug to a retracted position in the hole in the chamber wall, and means for applying the output from said wave generator through said wave guide to said oscilloscope.

2. In a wave meter including an oscilloscope, a wave guide, a wave generator connected to said wave guide, detector means for connecting the wave guide to the oscilloscope, and a resonant cavity coupled to said wave guide for providing deflections indicative of minimum and maximum limits on a screen of the oscilloscope, said resonant cavity comprising a cylinder, an annular end plate mounted on one end of the cylinder, a piston fitting closely in and mounted slidably in the cylinder and having a rod projecting through the annular end plate, adjustable means for locating the piston means in a predetermined position in the cylinder to determine the deflection indicative of minimum limits, a second end plate provided with a central bore therein opening on the inner face thereof, a small piston designed to fit into the bore in the second end plate to determine the deflection indicative of maximum limits, a push rod operable manually for pushing the small piston, means urging the push rod in a direction tending to retract the small piston into the bore from the cylinder, means for limiting such movement of the small piston to a position at which the inner end of the small piston is flush with the inner wall of the second end plate, and means for limiting movement of the push rod and the small piston in a direction projecting the small piston into the cylinder to a predetermined amount.

3. A resonant cavity, which comprises a cylinder, an end plate mounted on one end of the cylinder and provided with a central bore therethrough, a large piston designed to slidably engage the inner surface of cylinder having a piston rod mounted slidably in the bore in the end plate, adjustable means for moving the piston to a pre-selected position in the cylinder, a second end plate fixed to the opposite end of the cylinder and provided with an exteriorly threaded boss on the exterior base thereof, a bore centrally located extending through the boss and the remainder of the plate, a counterbore formed from the inner face of the second end plate to form a socket in the plate, a counterbore formed in the boss portion, a small piston designed to fit in the counterbore in the inner face of the plate and being of the same length as that of that counterbore, a rod mounted in the bore in the second end plate and secured rigidly to the small piston, a push button secured rigidly to the rod and having a shank portion extending slidably into the counterbore in the boss portion and also having a shoulder formed thereon, a sleeve designed to be threaded on the boss portion and to project beyond the boss portion for engagement by the shoulder on the push button to limit movement of the push button, means for locking the sleeve on the boss, and a compression spring mounted in the counterbore in the boss for urging the push button in a direction pulling the small piston into the counterbore facing the inner face of the end plate.

4. In a frequency measuring wave system, a broad band radio frequency generator, a T-section wave guide connected to said generator, a resonant cavity connected to one arm of said T-section wave guide, a second resonant cavity connected to another arm of said T-section wave guide, an impedance load in the third arm of said T-section wave guide, a detector connected to the junction of said arms for measuring the energy transmitted through said wave guide, an oscilloscope having a horizontal sweep equal to the frequency output of said generator, means for connecting the detector to control the vertical deflection of the oscilloscope whereby deflections are displayed indicative of the resonant frequencies of both said first and second resonant cavity, and a push-button plunger slidably mounted in said first resonant cavity for rapidly changing the resonant frequency of said cavity whereby the shift in resonant frequency is displayed as a shift in the vertical deflection on the oscilloscope.

References Cited in the file of this patent
UNITED STATES PATENTS

| | | | |
|---|---|---|---|
| 2,491,418 | Schlesman | Dec. 13, | 1949 |
| 2,498,548 | Howard | Feb. 21, | 1950 |
| 2,515,213 | Goddard et al. | July 18, | 1950 |
| 2,515,225 | Holst et al. | July 18, | 1950 |
| 2,593,234 | Wilson | Apr. 15, | 1952 |